July 3, 1928.
L. D. KAY
DUAL TIRED TRUCK WHEEL
Filed Jan. 11, 1927
1,675,934
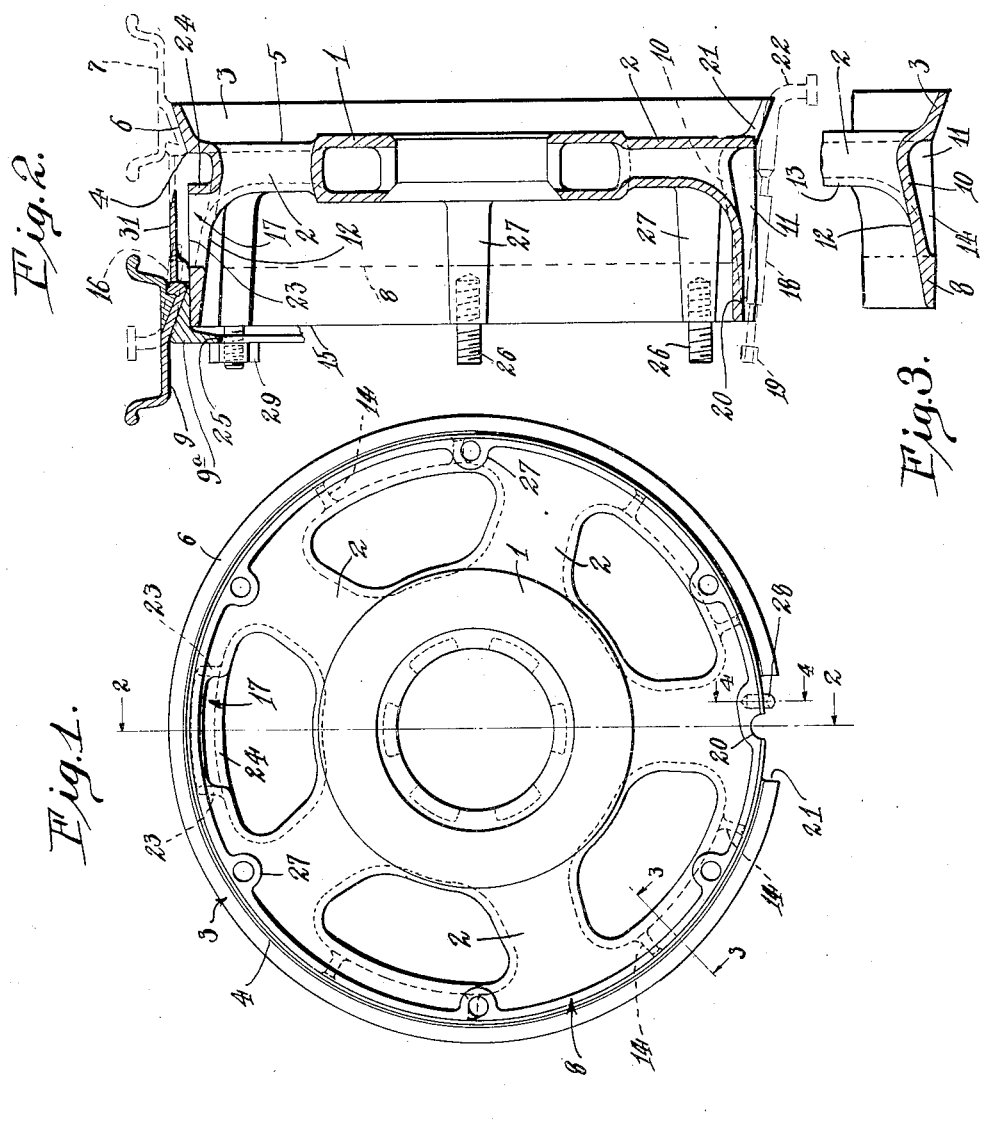
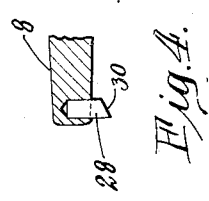
Inventor
Lloyd D. Kay
By Lyon & Lyon
Attorneys Patented July 3, 1928.

1,675,934

UNITED STATES PATENT OFFICE.

LLOYD D. KAY, OF LOS ANGELES, CALIFORNIA.

DUAL-TIRED TRUCK WHEEL.

Application filed January 11, 1927. Serial No. 160,350.

This invention relates to dual-tired truck-wheels, and particularly to wheels of this type that are constructed of cast steel or iron. In this type of wheel there are two tire-rim seats on which the tire-rims are supported, and in practice these tire-rim seats are a considerable distance apart on the rim of the wheel. The strains on the rim are considerable, and in order to give the rim sufficient strength it has been suggested to construct it of "box" form or girder form, in cross section. This form of rim, however, gives the wheel considerable weight, which is undesirable. In my Patent No. 1,526,913, dated February 17, 1925, I disclosed a dual-tired truck-wheel, the construction of which was characterized by substantially radial spokes connected by an arch-shaped web which passed continuously around the wheel, one edge of the arch carrying the inboard felloe and the other edge of the arch carrying the outboard felloe. A wheel having these features of construction is satisfactory where it is not necessary to keep the weight of the wheel down to a minimum.

The general object of this invention is to produce a dual-tired truck-wheel which will provide two tire-rim seats on its rim, but which, at the same time, will be of relatively light weight; also to provide an improved and simple construction for the rim of such a wheel which will give the wheel the requisite strength, and produce a wheel which can be readily cast and machined.

A further object of the invention is to provide an improved construction for the rim of such a wheel which will give the rim considerable strength and at the same time facilitate the guiding of the inboard tire-rim into place on its seat.

The invention consists of the novel parts and combination of parts to be described hereinafter, all of which contribute to produce an efficient dual-tired truck-wheel.

Further objects of the invention will appear hereinafter.

In the drawing:

Figure 1 is a side elevation of a dual-tired truck-wheel embodying my invention.

Figure 2 is a vertical section through the truck-wheel taken about on the line 2—2 of Figure 1.

Figure 3 is a cross-section taken on the line 3—3 of Figure 1 and illustrating the typical cross-section of the rim of the wheel.

Figure 4 is a cross-section taken on the line 4—4 of Figure 1, upon an enlarged scale, and showing only a portion of the rim of the wheel.

In practicing the invention I construct the wheel with a hub 1 which may be of any suitable construction. In the present instance this hub is of "box" form or girder form, in cross-section. From the hub 1 a plurality of spokes 2 extend out radially from the axis of the wheel. These spokes are all disposed in substantially the same plane and they are preferably of hollow form. In the present instance they are of a shape that might be described as "flattened tubular"; that is to say, they are of oblong or elliptical cross-section, with the major axis of the "ellipse" extending in the plane of the wheel.

The rim of the wheel includes an inboard felloe 3 which is in the form of a flange of substantially conical form, the wide end of the "cone" being disposed toward the inboard side of the wheel. The outboard end or edge of the flange 3 is substantially in line with the plane of the spokes of the wheel; in fact, I prefer to place this inner edge 4 of this flange so that it is substantially in line with the inboard wall 5 of the spokes, see Figure 2. The outer face 6 of the flange 3 constitutes the inboard tire-rim seat for the tire-rim 7, indicated in dotted lines. The felloe 3 integrally connects the spokes 2 and preferably extends substantially continuously around the wheel.

The rim includes an outboard felloe 8 which also extends substantially continuously around the wheel, and which operates as a secondary seat for the outboard tire-rim 9 indicated in Figure 2; that is to say, it supports the clamping ring 9ª on which the tire-rim is carried, as will appear hereinafter.

The felloes 3 and 8 are connected together by a concavo-convex web 10, see Figure 3, which illustrates the typical cross-section of the wheel rim. This web 10 has its convex side disposed toward the axis of the wheel and its concave side disposed outwardly so that between the felloes the web presents a recess 11 on its outer side. This recess 11 has its greatest depth substantially in line with the plane of the spokes, and is of gradually reduced depth toward the felloe 8; in other words, the inner side of the web is an inclined face 12 which extends across and merges into the inner face of the felloe 8. The outboard wall 13 of each spoke is connected to the inclined wall of the arch at the point 12 by a sweeping curve of relatively large radius. This enables the spokes to give a good bracing effect to the overhanging portion of the web and assists in effectively imparting the strains on the felloe 8 to the hub of the wheel.

It is customary in placing the tire-rims on the seats to place the inboard tire-rim 7 on its seat first by slipping it over the outboard portion of the wheel. In doing this with a wheel of this type the recess 11 would permit an eccentric or lateral movement of the tire-rim which would place it out of center with the axis of the wheel when it is attempted to place it on the seat 6. In order to overcome this difficulty and enable the relatively flat arched web to be employed, I provide a plurality of transverse ribs 14 which are disposed in radial planes with respect to the central axis of the wheel, and these ribs extend across the recess 11 and connect the felloes 3 and 8. The outer edge of each rib is substantially in line with the outer face or tire-rim seat of the felloe 8. In sliding the tire-rim 7 over the rim of the wheel the outer edge of these ribs 14 will guide the tire-rim and hold it properly centered when it is being shoved into place on the seat 6.

The rim of the wheel is relatively narrow, that is to say, I may make this rim so narrow that the outboard edge 15 of the wheel is substantially in line with the middle plane of the outboard tire-rim, thereby permitting substantially one-half of the outboard tire-rim 9 to overhang the outer edge of the wheel.

In order to facilitate access to the inflating nipple 16 of the outboard tire (indicated in dotted lines in Figure 2), I provide the web 10 at the proper point with an opening 17 through it. This opening enables the inflating hose to be passed out through the opening and screwed onto the threaded end of the inflating nipple. It will be evident that with this construction the inflating nipple 16 does not extend radially inward toward the axis of the wheel, but projects inwardly toward the truck, with the axis of the inflating nipple lying nearly parallel with the axis of the wheel and just outside of the felloe 8.

In order to give access to the inboard tire for inflating it with air, the inboard tire is provided with an inclined extension 18, see the lower side of Figure 2, which terminates in an inflating nipple 19. This extension 18 is disposed with its axis in an inclined position and lies in a transverse groove or channel 20 formed in the outboard felloe 8, see Figure 1. At the point where this inflating nipple is located, the flange 3 may be cut out if desired, so as to form a gap 21, to give clearance for the bend or elbow 22 in the inflating connection, which is necessary to connect the inner tube of the tire to the inclined extension 18.

The side walls or edges 23 of the opening 17 are constructed so that they operate as ribs, like the ribs 14, to guide the tire-rim 7 when being passed over the wheel onto its seat, and the inboard ends of these side walls or edges 23 are connected together by a web 24 which is of U-shape as shown in Figure 2, and connects at its inboard edge to the outboard end or edge of the flange 3. In other words, the typical section of the rim is maintained, with a flange or rib around the edge of the opening 17. This U-shaped web operates to give strength to the flange at this point and to compensate for the loss of the strength which would occur if the opening 17 extended all the way across to the flange 6.

The outboard tire-rim 9 is held in place in the usual manner by means of lugs, such as the lug 25 on clamping ring 9ª indicated in Figure 2, and broken away. These lugs are attached by means of studs 26, mounted in posts or bosses 27, which are cast integral with the rim of the wheel.

Opposite the gap 21 which is formed in the inboard felloe 3, and on the face of the felloe 8, I provide a small stop pin 28. This pin is useful in holding the outboard tire-rim 9 in place temporarily before the nuts 29 are tightened up to secure the clamping ring 9ª in place. If desired, the outer end of this pin 28 may have an inclined face 30, against which the inclined portion of the rim 9 seats. The tire-rims 7 and 9 are held apart by the distance ring 31.

It is understood that the embodiment of the invention described herein is only one of the many embodiments this invention may take, and I do not wish to be limited in the practice of the invention, nor in the claims, to the particular embodiment set forth.

What I claim is:

1. A dual-tired truck-wheel having a hub with a plurality of hollow spokes extending radially from the hub, an inboard felloe extending around the wheel, connecting the spokes, said felloe consisting of a flange having a substantially conical face on its outer side, constituting an inboard tire-rim seat, an outboard felloe extending around the wheel, having a face constituting a seat for the outboard tire-rim, said wheel having a relatively shallow dished concavo-convex web connecting the inboard felloe and the outboard felloe between the spokes, said web having its convex face disposed toward the axis of the wheel and its concave face disposed outwardly, and transverse ribs disposed in substantially radial planes with respect to the axis of the wheel, extending across the concave side of the web and connecting the felloes.

2. A dual-tired truck-wheel having a hub with a plurality of hollow spokes extending radially from the hub, an inboard felloe extending around the wheel, connecting the spokes, said felloe consisting of a flange having a substantially conical face on its outer side, constituting an inboard tire-rim seat, an outboard felloe extending around the wheel, having a face constituting a seat for the outboard tire-rim, said wheel having a relatively shallow dished concavo-convex web connecting the inboard felloe and the outboard felloe between the spokes, said web having its convex face disposed toward the axis of the wheel and its concave face disposed outwardly, and transverse ribs disposed in substantially radial planes with respect to the axis of the wheel, extending across the concave side of the web and connecting the felloes, the outer edge of each rib being substantially in line with the inner edge of the inboard felloe, whereby the ribs operate as guides for supporting and centering the inboard tire-rim in slipping the same over the web and onto the inboard felloe.

3. A dual-tired truck-wheel having a hub with a plurality of separated equidistant spokes extending radially from the hub, an inboard felloe extending around the wheel connecting the spokes and consisting of a flange the outer face whereof constitutes the inboard tire-rim seat, an outboard felloe extending around the wheel having an outer face constituting the only seat for the outboard tire-rim, said wheel having a relatively shallow dished concavo-convex web connecting the felloes, said web having its convex face disposed toward the axis of the wheel and its concave face disposed outwardly, the outboard edge of the said flange being disposed substantially in the plane of the spokes, and the outboard wall of each spoke being connected to the inner face and outboard end of the web by sweeping curves of relatively large radius substantially tangent to the inboard side of the spoke.

4. A dual-tired truck-wheel having a hub with a plurality of separated equidistant spokes extending radially from the hub, an inboard felloe extending around the wheel connecting the spokes and consisting of a flange the outer face whereof constitutes the inboard tire-rim seat, an outboard felloe extending around the wheel having an outer face constituting the seat for the outboard tire-rim, said wheel having a relatively shallow dished concavo-convex web connecting the felloes, said web having its convex face disposed toward the axis of the wheel and its concave face disposed outwardly, the outboard edge of the said flange being disposed substantially in the plane of the spokes, the outboard wall of each spoke being connected to the outboard end of the web by sweeping curves of relatively large radius tangent to the web on its inner side, and transverse ribs disposed in substantially radial planes with respect to the axis of the wheel, extending across the concave side of the web and connecting the felloes.

5. A dual-tired truck-wheel having a hub with a plurality of hollow spokes extending radially from the hub, an inboard felloe extending around the wheel connecting the spokes, said felloe consisting of a flange of substantially conical form with the small end of the "cone" substantially in line with the walls of the spokes on their inboard side, the outer side of said flange constituting the inboard tire-rim seat, an outboard felloe extending around the wheel, the outer face whereof constitutes a seat for the outboard tire-rim, said wheel having a relatively shallow dished concavo-convex web connecting the said felloes between the spokes, said web having its convex face disposed toward the axis of the wheel and its concave face disposed outwardly, and transverse ribs disposed in substantially radial planes with respect to the axis of the wheel extending across the concave side of the web and connecting the felloes.

6. A dual-tired truck-wheel having a hub with a plurality of hollow spokes extending radially from the hub, an inboard felloe extending around the wheel connecting the spokes adjacent their inboard sides, said felloe consisting of a flange of substantially conical form, the outer face of said flange constituting the inboard tire-rim seat, an outboard felloe extending around the wheel removed from the plane of the spokes, the outer side of said outboard felloe constituting a seat for the outboard tire-rim, said wheel having a relatively shallow dished concavo-convex web connecting the said felloes between the spokes, said web having a recess on its concave face disposed outwardly, said recess having its greatest depth at a point substantially in the same plane with the spokes, and being of gradually reduced depth toward the outboard felloe, and transverse ribs disposed in substantially radial planes with respect to the axis of the wheel extending across the concave side of the web and connecting the felloes.

7. A dual-tired truck-wheel having a hub with a plurality of hollow spokes extending radially from the hub, an inboard felloe extending around the wheel, connecting the spokes, said felloe consisting of a flange having a substantially conical face on its outer side, constituting an inboard tire-rim seat, an outboard felloe extending around the wheel, having a face constituting a seat for the outboard tire-rim, said wheel having a relatively shallow dished concavo-convex web connecting the inboard felloe and the outboard felloe between the spokes, said web having its convex face disposed toward the axis of the wheel and its concave face disposed outwardly.

8. A dual-tired truck-wheel having a hub with a plurality of spokes extending radially from the hub, an inboard felloe extending around the wheel connecting the spokes and consisting of a flange the outer face whereof constitutes the inboard tire-rim seat, an outboard felloe extending around the wheel having an outer face constituting a seat for the outboard tire-rim, said wheel having a relatively shallow dished concavo-convex web connecting the felloe with its convex face disposed toward the axis of the wheel and its concave face disposed outwardly, the outboard edge of the said flange being disposed substantially in the plane of the spokes with the outboard wall of each spoke connected with the outboard end of the web by sweeping curves of relatively large radius tangent to the inner side of the web, and transverse ribs disposed in substantially radial planes with respect to the axis of the wheel extending across the concave side of the web and connecting the felloes.

Signed at Los Angeles Calif. this 31 day of December 1926.

LLOYD D. KAY.